US012592427B2

(12) United States Patent
Wang et al.

(10) Patent No.: US 12,592,427 B2
(45) Date of Patent: Mar. 31, 2026

(54) BATTERY PACK WITH INTEGRATED HEATER

(71) Applicant: Google LLC, Mountain View, CA (US)

(72) Inventors: David Wang, Mountain View, CA (US); Pak Heng Lau, Sunnyvale, CA (US); Lauren Francine Chanen, San Francisco, CA (US); James Robert Lim, Mountain View, CA (US)

(73) Assignee: Google LLC, Mountain View, CA (US)

( * ) Notice: Subject to any disclaimer, the term of this patent is extended or adjusted under 35 U.S.C. 154(b) by 500 days.

(21) Appl. No.: 18/044,035

(22) PCT Filed: Sep. 2, 2021

(86) PCT No.: PCT/US2021/048941
§ 371 (c)(1),
(2) Date: Mar. 3, 2023

(87) PCT Pub. No.: WO2022/055790
PCT Pub. Date: Mar. 17, 2022

(65) Prior Publication Data
US 2023/0335824 A1 Oct. 19, 2023

Related U.S. Application Data

(60) Provisional application No. 63/075,709, filed on Sep. 8, 2020.

(51) Int. Cl.
*H01M 10/627* (2014.01)
*H01M 10/48* (2006.01)
(Continued)

(52) U.S. Cl.
CPC ....... *H01M 10/627* (2015.04); *H01M 10/486* (2013.01); *H01M 10/615* (2015.04);
(Continued)

(58) Field of Classification Search
CPC ............. H01M 10/627; H01M 10/615; H01M 10/637; H01M 10/655; H01M 10/6571;
(Continued)

(56) References Cited

U.S. PATENT DOCUMENTS

| 5,924,269 | A | 7/1999 | Mcmillen |
| 10,319,213 | B1 | 6/2019 | Conner |

(Continued)

FOREIGN PATENT DOCUMENTS

| CN | 103515669 | 1/2014 |
| CN | 111211361 | 5/2020 |

(Continued)

OTHER PUBLICATIONS

"Foreign Office Action", JP Application No. 2023-515186, Jun. 18, 2024, 7 pages.

(Continued)

*Primary Examiner* — Karie O'Neill Apicella
(74) *Attorney, Agent, or Firm* — Colby Nipper PLLC

(57) ABSTRACT

This application is directed to a battery having a heating element. A connector of the battery includes a first terminal, a second terminal, and a heater terminal. One or more rechargeable battery cells are electrically coupled to the first and second terminals of the connector. The heating element is in contact with a subset of the battery cells, and includes a resistive heater path that is electrically coupled to the first and heater terminals of the connector and generates heat to warm the battery when a heater voltage is applied to the heater terminal. A waterproof material is wrapped around an exterior of the heating element and battery cells and prevents ambient water from contacting the heater element and battery cells. The waterproof material includes an opening to allow at least the first and second terminals of the connector to be electrically coupled to a logic board.

20 Claims, 10 Drawing Sheets

(51) Int. Cl.

| | |
|---|---|
| *H01M 10/615* | (2014.01) |
| *H01M 10/637* | (2014.01) |
| *H01M 10/655* | (2014.01) |
| *H01M 10/6571* | (2014.01) |
| *H01M 50/24* | (2021.01) |
| *H01M 50/509* | (2021.01) |
| *H01M 50/519* | (2021.01) |

(52) U.S. Cl.
CPC ....... *H01M 10/637* (2015.04); *H01M 10/655* (2015.04); *H01M 10/6571* (2015.04); *H01M 50/24* (2021.01); *H01M 50/509* (2021.01); *H01M 50/519* (2021.01); *H01M 2220/10* (2013.01)

(58) Field of Classification Search
CPC .. H01M 10/486; H01M 50/24; H01M 50/519; H01M 50/509
See application file for complete search history.

(56) References Cited

U.S. PATENT DOCUMENTS

| | | |
|---|---|---|
| 2018/0322743 A1 | 11/2018 | Chen et al. |
| 2020/0175840 A1* | 6/2020 | Conner ............ G08B 13/19695 |

FOREIGN PATENT DOCUMENTS

| | | |
|---|---|---|
| EP | 3373408 | 9/2018 |
| EP | 3445046 | 2/2019 |
| JP | 2004047133 A | 2/2004 |
| JP | 2004171897 A | 6/2004 |
| JP | 2012079483 A | 4/2012 |
| JP | 2014116240 A | 6/2014 |
| KR | 20180103629 A | 9/2018 |
| WO | 2012105636 A1 | 8/2012 |
| WO | 2017108651 | 6/2017 |
| WO | 2017160906 | 9/2017 |
| WO | 2022055790 | 3/2022 |

OTHER PUBLICATIONS

"Foreign Office Action", CN Application No. 202180054238.0, May 12, 2025, 11 pages.
"Foreign Office Action", KR Application No. 10-2023-7008239, May 15, 2025, 18 pages.
"International Preliminary Report on Patentability", Application No. PCT/US2021/048941, Mar. 7, 2023, 7 pages.
"International Search Report and Written Opinion", Application No. PCT/US2021/048941, Jan. 4, 2022, 11 pages.
"Foreign Office Action", CA Application No. 3, 189,710, Dec. 15, 2025, 4 pages.

* cited by examiner

BATTERY PACK WITH INTEGRATED HEATER

RELATED APPLICATION(S)

This application is a national stage entry of International Application No. PCT/US2021/048941, filed Sep. 2, 2021, which claims the benefit of U.S. Provisional Application No. 63/075,709, filed Sep. 8, 2020, the disclosures of which are incorporated herein by reference in their entirety.

BACKGROUND

Outdoor electronic devices (e.g., outdoor cameras) can be exposed to very low temperatures that are problematic for rechargeable lithium-ion batteries installed in such devices. At such low temperatures, electrochemical kinetics may be significantly reduced during the course of charging and discharging lithium-ion batteries, which may increase battery impedance. For example, an average temperature in Canada ranges from $-5°$ C. to $-15°$ C. during the winter months of January and February and the impedance of a lithium-ion battery having an energy capacity of ~500 mAh may increase by five times at this temperature range compared to the impedance of the lithium-ion battery at room temperature. The impedance increase of lithium-ion batteries may reduce their discharge capacity and result in a significant drop in a runtime of electronic devices powered by the batteries. In addition, while lithium-ion batteries are powering operations of an electronic device, the impedance increase may lead to unwanted voltage drops on the batteries themselves, which may increase the possibility of a device brownout (i.e., an unintentional voltage drop in a power supply of the electronic device that interrupts device operations). As such, there is a need for a mechanism to prolong device runtimes and avoid device brownouts in many battery-powered electronic devices that are designed for use in low temperature environments.

SUMMARY

This disclosure describes methods for warming up a battery of an electronic device (e.g., an outdoor camera, a doorbell camera) that is exposed to a low temperature environment. The battery includes one or more rechargeable battery cells electrically coupled to two terminals. A heating element is integrated physically with the one or more rechargeable battery cells of the battery and shares one of the two terminals with the battery cells. When the heating element is heated up, the battery is warmed up, such that the battery can be protected from operating at a low temperature. As a result of warming up the battery, the impedance and discharge capacity of the battery are not compromised, and the device runtime or power supply of the electronic device, if powered by the battery, do not drop undesirably. Additionally, in some embodiments, the battery is modified to incorporate packaging features to deter water permeation while maintaining a compact form factor.

In one aspect, some implementations include a battery having a connector, one or more rechargeable battery cells, a heating element, and a waterproof material. The connector includes a first terminal, a second terminal, and a heater terminal. The one or more one or more rechargeable battery cells are electrically coupled to the first and second terminals of the connector. The heating element is in contact with at least a subset of the one or more rechargeable battery cells, e.g., is wrapped around an exterior of the one or more rechargeable battery. The heating element includes a resistive heater path electrically coupled to the heater terminal and one of the first and second terminals of the connector. The resistive heater path of the heating element generates heat to warm the battery when a heater voltage is applied to the heater terminal. The waterproof material is wrapped around an exterior of the heating element and the one or more rechargeable battery cells. The waterproof material prevents ambient water from contacting the heater element and battery cells. The waterproof material further includes an opening to allow at least the first and second terminals of the connector to be electrically coupled to a logic board (e.g., which is distinct from and external to the battery).

In some implementations, the heater terminal is electrically coupled to an output of a temperature control circuit that provides the heater voltage to the heater terminal when an operating temperature of the battery is lower than a threshold temperature. The temperature control circuit dynamically adjusts the heater voltage according to the operating temperature of the battery. The temperature control circuit is optionally disposed on the logic board or enclosed in the waterproof material.

In some implementations, the battery further includes a negative temperature coefficient (NTC) thermistor having a first resistance configured to vary with an operating temperature of the battery. The connector further includes an NTC terminal electrically coupled to the NTC thermistor.

Thus, electronic systems and devices are provided with a rechargeable battery that is integrated with a heating element, particularly when the electronic device has a compact form factor and/or is used in a low temperature environment.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIGS. 7A and 7B illustrate a battery that has not been wrapped with a waterproof material, and FIG. 7C illustrates a battery that is wrapped with the waterproof material.

Like reference numerals refer to corresponding parts throughout the several views of the drawings.

DETAILED DESCRIPTION

In various implementations of this application, a heating element is integrated into a battery that includes one or more battery cells and may refer to a battery pack when the one or more battery cells are packaged with additional functional components (e.g., a temperature sensor, protection circuit). When an electronic device having such a battery is used in a low temperature environment, the heating element generates heat to warm the battery. The heating element is integrated with the battery in a compact package that reduces a bill of material (BOM) needed to manufacture the battery. The battery includes an internal protection circuit module (PCM), a connector external to a body of the battery, and a wire connecting the PCM to the connector. An additional connection board is used to support the PCM and is electrically coupled to two opposite ends of the heating element. One of the two opposite ends of the heating element is electrically coupled to an existing anode or cathode of the battery (e.g., an existing battery pack system ground) on the connection board, and shares the same existing connection pad on the connection board, wire, and connector terminal with the anode or cathode of the battery. As such, the existing connection board, connector and wire are shared by the battery cells and the heating element, and there is no need to add a separate heater board, wire or connector for the heating element. An electronic device having such a battery can further save space on an external logic board coupled to the battery, because the logic board does not need to accommodate two connectors that are coupled to battery terminals and heater terminals separately.

In some implementations, the heating element is integrated into the battery when the battery is assembled by a battery supplier. The heating element optionally includes a heat generating sheet that is wrapped directly onto a battery cell to facilitate thermal transfer. A waterproof material (e.g., a wrap with a package label) is further wrapped around an exterior of the heating element and the battery cell to hold the heating element closely to the battery cell. Application of this waterproof material introduces a heat barrier to protect the battery cell from the low temperature environment and protects the heating element from delamination and separation from a battery pack surface over time.

The heating element is powered by a system power rail and can only function when the battery is assembled into an electronic device and its connector is electrically coupled to and driven by the external logic board. When the connector of the battery is not connected to the external logic board, the anode and cathode of the battery and the two opposite ends of the heating element are open and floating.

Figures 1A, 1B:
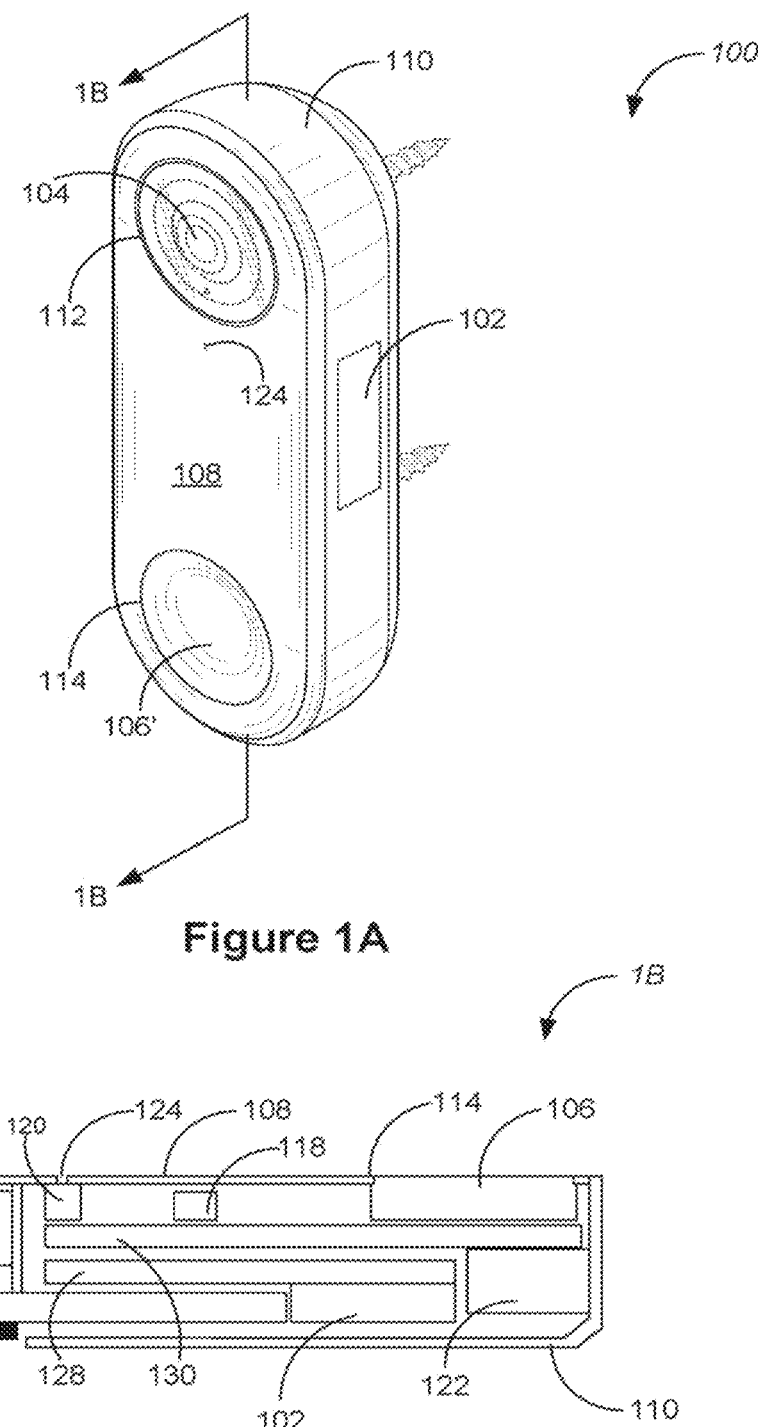
FIG. 1A illustrates an example electronic device including a rechargeable battery, in accordance with some implementations.
FIG. 1B is a cross sectional view of the electronic device, in accordance with some implementations.

FIG. 1A illustrates an example electronic device 100 including a rechargeable battery 102 in accordance with some implementations, and FIG. 1B is a cross sectional view 1B of the electronic device 100 taken along a cross section 1B-1B of the electronic device 100 illustrated in FIG. 1A, in accordance with some implementations. The electronic device 100 is a doorbell camera device integrating a camera module and a doorbell system within a device housing 110.

As a doorbell camera, the device 100 is likely to be used in cold outdoor environments and is therefore an ideal device to use a camera with an integrated heater as described herein. The camera module includes a lens assembly 104 and an image sensor 132 that are configured to capture images, and a wireless transceiver that is configured to exchange data with a remote server over one or more wireless communication networks. The doorbell system is configured to ring a remote chime device in response to a press on a button top 106' of a button assembly 106.

In some implementations, the device housing 110 includes a front cover plate 108 that seals at least a plurality of electronic components, the lens assembly 104 and the button assembly 106 within the device housing 110. The front cover plate 108 includes a button opening 114 configured to expose the button top 106' on the front cover plate 108. The button top 106' is part of the button assembly 106, and is configured to receive a user press on the button assembly 106. In some implementations, the front cover plate 108 further includes a camera opening 112 that exposes the lens assembly 104. The lens assembly 104 includes a cover glass configured to protect the lens assembly 104. The electronic device 100 may include an array of IR illuminators 118 disposed behind the substantially opaque area. The IR illuminators 118 are concealed under the front cover plate 108, but light generated by the IR illuminators 118 can still penetrate the front cover plate 108 to illuminate the field of view of the electronic device 100.

In some implementations, the electronic device 100 further includes an ambient light sensor (ALS) assembly (not shown in FIG. 1B) at least partially disposed within the lens assembly 104. The ALS assembly is configured to measure amount of light entering the lens assembly 104 from an ambient environment surrounding the lens assembly 104. The electronic device 100 may further include a microphone 120 and a speaker 122. The microphone 120 is concealed behind the front cover plate 108 that has a microphone aperture 124 allowing a sound wave to reach the microphone 120. A remote user may review live video streams captured by the camera module of the electronic device 100, and have a conversation in real-time with a visitor via the microphone 120 and speaker 122.

The electronic device 100 may include at least a sensor board 126, a main board 128 and a secondary board 130 that are stacked within the device housing 110. The main board 128 includes at least a central processing unit (CPU) and a memory system (e.g., including memory and a memory controller). An image sensor array 132 may be disposed on top of an end of the sensor board 126. The secondary board 130 may include at least one or more of wireless transceiver circuit, IR illuminator drivers, an LED indicator driver, and an audio signal processor (not shown in FIG. 1B).

In some implementations, a rechargeable battery 102 is mounted on the main board 128, and electrically coupled to the main board 128 via a connector. The main board 128 may be flipped and bonded to the sensor board 126. When the main board 128 is offset from the sensor board 126, the rechargeable battery 102 may be positioned beside the sensor board 126 and take advantage of compact space within the device housing 110. In some implementations, the sensor board 126 regulates supply voltages provided externally including providing these supply voltages to charge the rechargeable battery 102, and the main board 128 manages operation of the rechargeable battery 102, so as to provide power to the sensor and secondary boards 126 and 130 when an external power supply is not available. In some situations, the electronic device 100 is not disconnected from an external power source, and the battery 102 is configured to drive the camera system of the electronic device 100 during a brief duration of time, e.g., when the button top 106' is pressed. Alternatively, in some situations, the battery 102 is used to power operation of the electronic device 100 that is disconnected from any external power source for an extended duration of time before the battery 102 is connected to and charged by an external power source.

Referring to FIG. 1A, the electronic device 100 is a doorbell camera device that is normally installed outside a building and exposed to an outdoor environment, and thus, is exposed to fluctuation of an outdoor temperature. In some implementations, the rechargeable battery 102 is disabled from being charged in accordance with a determination that a temperature of the rechargeable battery is greater than a first threshold temperature (e.g., 45° C.). Conversely, in some situations, the outdoor temperature drops below a second threshold temperature, e.g., 0° C., and the battery 102 of the electronic device 100 may be impacted by the drop of the outdoor temperature. In some implementations, a heating element is integrated in the rechargeable battery 102, and the heating element heats the rechargeable battery 102 in accordance with a determination that the temperature of the rechargeable battery is less than the second threshold temperature (e.g., 0° C.)). The heating element is disabled from heating the rechargeable battery 102 in accordance with a determination that the temperature of the rechargeable battery is equal to or greater than a third threshold temperature. The third threshold temperature is optionally equal to and distinct from the second threshold temperature.

Figure 2:
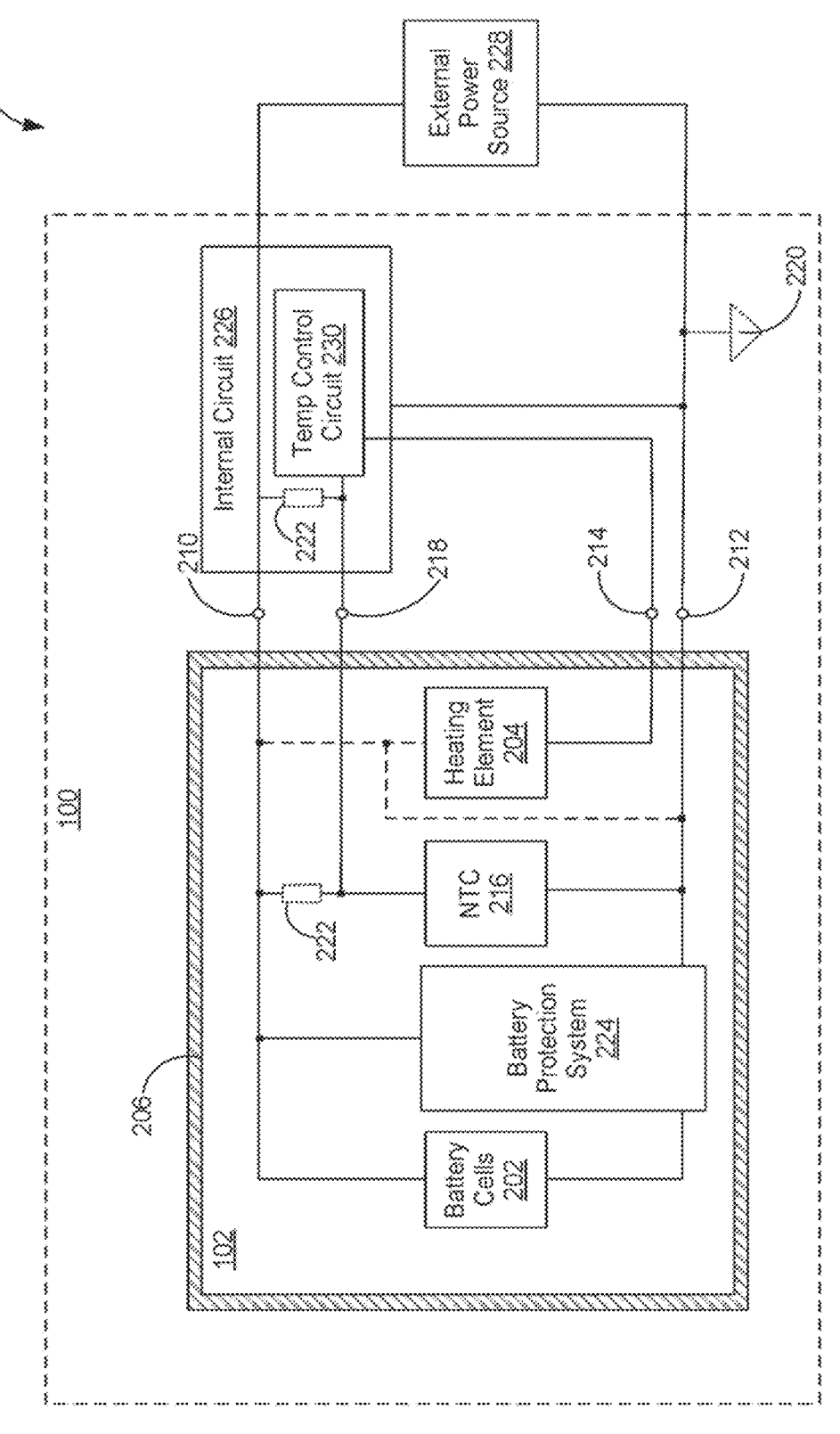
FIG. 2 is a circuit diagram of a battery charging and discharging system of an electronic device, in accordance with some implementations.

FIG. 2 is a circuit diagram of a battery charging and discharging system 200 of an electronic device 100, in accordance with some implementations. The electronic device 100 includes a battery 102. Optionally, the battery 102 is built into the electronic device 100 or is a replaceable module in the electronic device 100. In some implementations, the battery 102 includes a single rechargeable battery cell 202. In some implementations, the battery 102 includes a plurality of rechargeable battery cells 202 electrically coupled to each other. For example, in some implementations, the plurality of rechargeable battery cells 202 of the battery 102 can be coupled according to a 1SnP parallel battery configuration, in which n is an integer indicating a number of battery cells 202 connected in parallel (e.g., 1S2P, 1S3P, 1S4P): an mSIP serial battery configuration, in which m is an integer indicating a number of battery cells 202 connected in series (e.g., 2S2P): or an mSnP mixed battery configuration. In this application, the battery 102 broadly refers to a battery pack that packages the one or more battery cells 202 with additional functional components (e.g., a heating element 204, NTC thermistor 216, and battery protection system 224).

In some implementations, the battery 102 is electrically coupled to an internal circuit 226 including various components of the electronic device 100 such as CPU(s), memory, data input device(s), data output device(s), lens assemblies, heat sink(s), image sensor array(s), infrared illuminator(s), filter(s), etc. The internal circuit 226 is implemented on the main board 128, the sensor board 126, and/or the secondary board 130. In some implementations, an external power source 228 is coupled to the battery 102 and the internal circuit 226. The external power source 228 is used to charge the battery 102 of the electronic device 100 and power the internal circuit 226.

In some implementations, the one or more battery cells 202 are electrically coupled to a battery protection system 224 that is configured to protect the one or more battery cells

202 while the electronic device 100 is being charged by the external power source 228 or any other electrical source and/or while the battery 102 is being discharged to drive the internal circuit 226 of the electronic device 100. In some implementations, the battery protection system 224 is used to detect when at least one rechargeable battery cell of the plurality of rechargeable battery cells 202 that form the battery 102 disconnects or fails to charge. In some implementations, the battery protection system 224 is designed within a protection circuit module of the battery 102. In some implementations, the one or more battery cells 202 and the battery protection system 224 are integrated into a single package/enclosure of a battery pack contained within the electronic device 100. In other implementations not shown, the battery protection system 224 is packaged as a distinct package/component from the battery 102.

In some implementations, the battery 102 includes a heating element 204 and a waterproof material 206 in addition to the one or more battery cells 202. The heating element 204 is disposed in contact with at least a subset of the one or more battery cells 202, e.g., is wrapped around an exterior of the one or more rechargeable battery cells 202. The heating element 204 includes a resistive heater path configured to generate heat to warm the one or more battery cells 202. The waterproof material 206 is wrapped around an exterior of the heating element 204 and the one or more rechargeable battery cells 202, and prevents ambient water from contacting the heater element 204 and battery cells 202.

The battery 102 further includes a connector (e.g., connector 306 in FIG. 3) configured to electrically couple the battery 102 to the internal circuit 226 and/or external power source 228, e.g., more specifically to the main board 128. The connector includes a first terminal 210, a second terminal 212, and a heater terminal 214. The first and second terminals 210 and 212 are coupled to two opposite electrodes (i.e., an anode and a cathode) of the one or more battery cells 202, allowing the one or more battery cells 202 to charge and discharge with the first and second terminals 210 and 212. The second terminal 212 is optionally coupled to a ground supply 220. The resistive heater path of the heating element 204 are electrically coupled to the heater terminal 214 and one of the first and second terminals 210 and 212 of the connector. When a heater voltage is applied to the heater terminal 214, the resistive heater path of the heating element 204 generates heat to warm the battery 102. The waterproof material 206 that is wrapped around the exterior of the heating element 204 has an opening to allow at least the first and second terminals 210 and 212 of the connector to be electrically coupled to a logic board separate from the battery 102, e.g., the main board 128.

The first terminal 210) and second terminal 212 are electrically coupled to a high supply node (i.e., the cathode) and a low supply node (i.e., the anode) of the one or more battery cells 202, respectively. In some implementations, the resistive heater path is electrically coupled between the first terminal 210 and heater terminal 214. When an operating temperature of the battery 102 is lower than a threshold temperature, the heater voltage is lower than the high supply node coupled to the first terminal 210, and positively related to the operating temperature of the battery 102 (i.e., increasing with an increase of the operating temperature). Conversely, in some implementations, the resistive heater path is electrically coupled between the heater terminal 214 and the second terminal 212. When an operating temperature of the battery 102 is lower than a threshold temperature, the heater voltage is higher than the low supply node coupled to the second terminal 212, and inversely related to the operating temperature of the battery (i.e., decreasing with an increase of the operating temperature). Further, in some implementations, the low supply node of the battery 102 may be grounded, and the second terminal 212 is grounded with the low supply node.

Further, in some implementations, the battery 102 further includes a negative temperature coefficient (NTC) thermistor 216 having a first resistance configured to vary with an operating temperature of the battery 102. The connector further includes an NTC terminal 218 coupled to the NTC thermistor 216. An output of the NTC terminal 218 indicates the operating temperature of the battery 102, and the heater voltage is applied to the heater terminal 214 in accordance with a determination that the output of the NTC terminal 218 satisfies a predefined heating condition. For example, the output of the NTC terminal 218 is used to determine whether the operating temperature of the battery is lower than a threshold temperature. The heater voltage can be dynamically adjusted according to the output of the NTC terminal 218. Further, in some implementations, the NTC thermistor 216 is coupled in series with a resistor 222. The resistor 222 and the NTC thermistor 215 are electrically biased between the first and second terminals 210 and 212. The resistor 222 has a second resistance that remains substantially constant or varies within a small tolerance with the operating temperature of the battery 102. The resistor 222 is optionally disposed out of the battery 102, e.g., in the internal circuit 226, or inside the battery 102.

In some implementations, the heater terminal 214 is electrically coupled to an output of a temperature control circuit 230 that provides the heater voltage to the heater terminal 214 when an operating temperature of the battery 102 is lower than a threshold temperature. The temperature control circuit 230 dynamically adjusts the heater voltage according to the operating temperature of the battery 102. Optionally, the temperature control circuit 230 is part of the internal circuit 226 of the electronic device 106, and is external to the battery 102, e.g., on the main board 128. Optionally, the temperature control circuit 230 is integrated in the battery 102, rather than being mounted on any of the sensor board 126, main board 128, and secondary board 130.

Figures 3A, 3B:
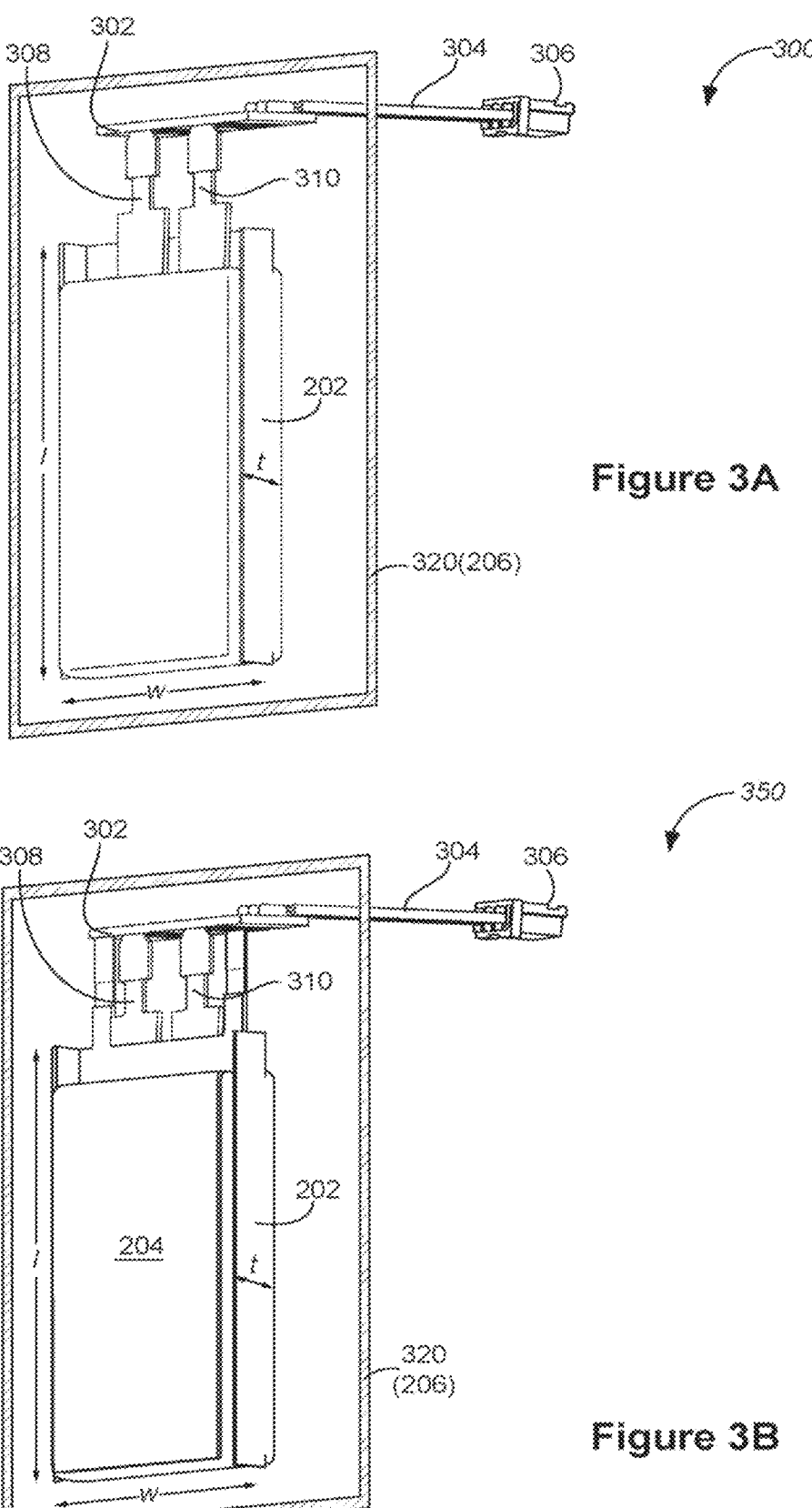
FIG. 3A illustrates an example battery that does not integrate a heating element.
FIG. 3B illustrates an example battery that integrates a heating element, in accordance with some implementations.

FIG. 3A illustrates an example battery 300 that does not integrate a heating element 204, and FIG. 3B illustrates an example battery 350 that integrates a heating element 204, in accordance with some implementations. The battery 300 includes one or more rechargeable battery cells 202, an internal connection board 302, a battery interconnect link 304, and a connector 306. The battery 300 has two opposite electrodes including a cathode 308 and an anode 310, and electric current can flow out of a polarized electrical gadget of a battery cell 202 through the cathode 308 towards the anode 310 of the battery 300. The one or more rechargeable battery cells 202 are electrically coupled between the cathode 308 and anode 310 according to a battery configuration (e.g., a 1SnP parallel battery configuration, an mSnP mixed battery configuration). The cathode 308 and anode 310 of the battery 300 are electrically coupled to two distinct battery pads on the internal connection board 302, e.g., a first battery pad and a second battery pad. The connector 306 is connected to the internal connection board 302 via the battery interconnect link 304. That said, the connector 306 includes a first terminal 210 and a second terminal 212 that are electrically coupled to the first and second battery pads of the internal connection board 302, and then to the cathode 308 and anode 310 of the battery 300, respectively.

An external packaging sheet 320 is applied to enclose the one or more rechargeable battery cells 202, the cathode 308 and anode 310, the internal connection board 302, and a battery end of the battery interconnect link 304. The external packaging sheet 320 is has an opening to allow the battery interconnect link 304 to extend away from the battery cells 202 and reach an external logic board (e.g., the main board 128). In some implementations, the external packaging sheet 320 includes a waterproof material 206 that prevents ambient water from contacting the one or more rechargeable battery cells 202 and internal connection board 302. It is noted that FIGS. 3A and 3B are conceptual diagrams, and the external package sheet 320 is closely wrapped around the one or more rechargeable battery cells 202 in many embodiments.

Referring to FIG. 3B, in some implementations, a heating element 204 is wrapped around and comes into contact with an exterior of the one or more rechargeable battery cells 202. The heating element includes a resistive heater path having a first path end 322 and a second path end 324. Each of the first and second path ends 322 and 324 is supported by a respective portion of a substrate of the heating element 204 that extends in proximity to the anode or cathode of the battery 202 to reach the internal connection board 302. The first and second path ends 322 and 324 are electrically coupled to a first heater pad and a second heater pad of the internal connection board 302, respectively. The first heater pad is electrically coupled to a heater terminal 214 of the connector 306 via a heater interconnect of the battery interconnect link 304. The second heater pad is electrically coupled to the first or second battery pad, and therefore, coupled to the first or second terminal 210 or 212 of the connector 306 via the battery interconnect link 304. When a heater voltage is applied to the heater terminal and when the first and second terminals are coupled to supply voltages, a current flows through the resistive heater path to make the resistive heater path of the heating element 204 generate heat to warm up the battery 350.

Additionally, a waterproof material 206 is applied to enclose the heating element 204, the one or more rechargeable battery cells 202, the cathode 308 and anode 310, the internal connection board 302, and the battery end of the battery interconnect link 304. The waterproof material 206 has an opening to allow the battery interconnect link 304 to extend away from the battery cells 202 and reach an external logic board (e.g., the main board 128). The waterproof material 206 prevents ambient water from contacting the one or more rechargeable battery cells 202 and internal connection board 302.

In some implementations, integration of the heating element 204 in the battery 350) does not require a separate connection board, a separate interconnect link, or a separate connector. Rather, the existing connection board 302, interconnect link 304, and connector 306 are modified to support the heating element 204. Specifically, in some implementations, two heater pads are added to the connection board 302, and a heater interconnect is added to the interconnect link 304. The connector 306 is modified to include only one more heater terminal 214. The heating element 204 shares an interconnect and a terminal with the one or more battery cells 202. Alternatively, in some implementations, neither of the first and second heater pads is electrically coupled to or shorted to one of the first and second battery pads on the internal connection board 302. The connector 306 is modified to include two heater terminals. The first and second heater pads are electrically coupled to the two heater terminals of the connector 306 via two distinct heater interconnects added to the interconnect link 304. By these means, the heating element 204 has its own connections separate from battery cell connections on a battery level, while not requiring a separate connector board, interconnect link, or connector.

Figures 4A, 4B, 4C:
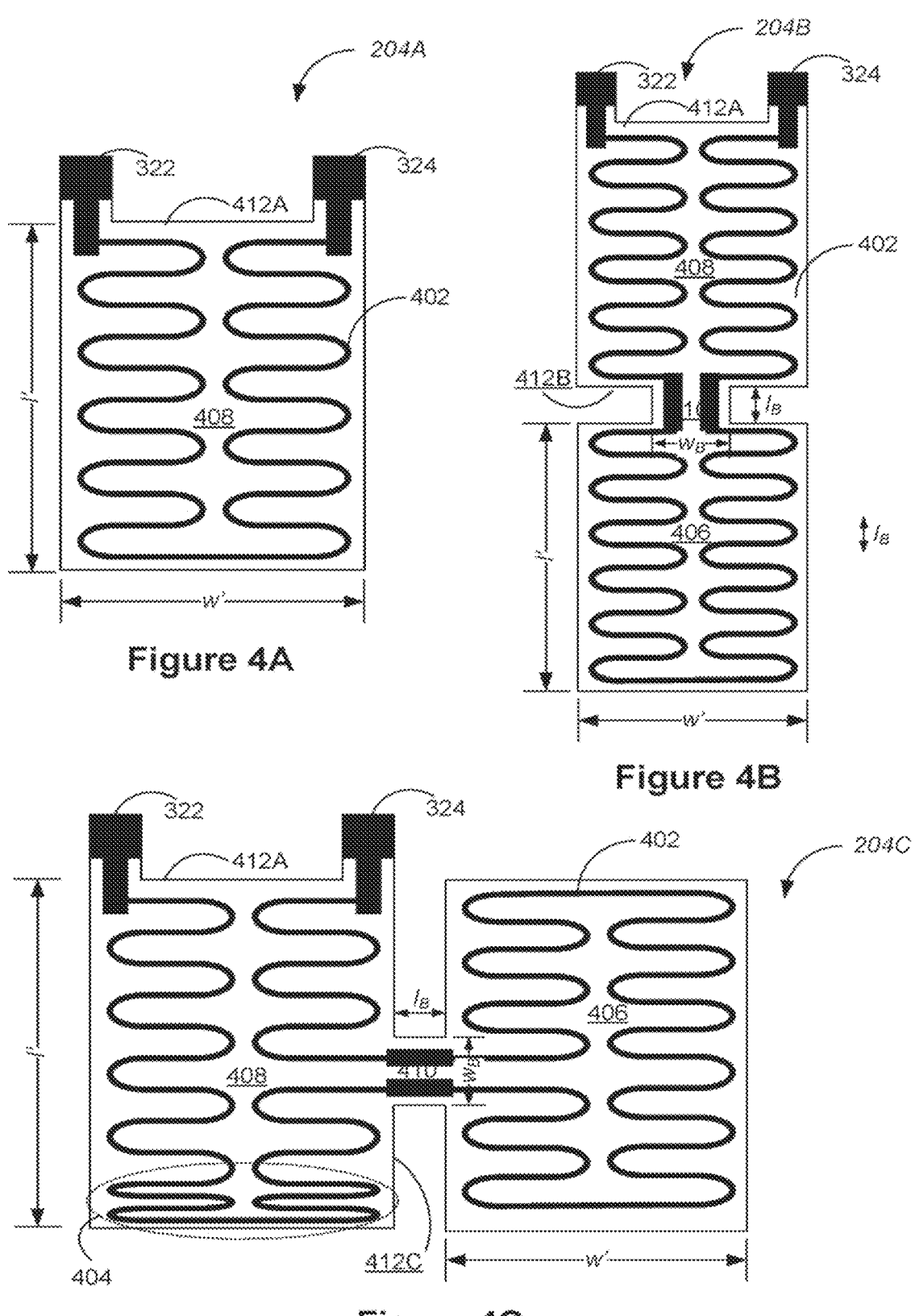
FIGS. 4A-4C illustrate three example heating elements each of which can be integrated in a battery of an electronic device, in accordance with some implementations.

FIGS. 4A-4C illustrate three example heating elements 204A-204C each of which can be integrated in a battery 102 of an electronic device 100, in accordance with some implementations. Each heating element 204 has a polymeric substrate that supports and electrically insulates different portions of a resistive heater path 402. The polymeric substrate is optionally made of polyimide. In some implementations, the resistive heater path 402 follows a pattern (e.g., having a serpentine shape) that is distributed evenly across the substrate of the heating element 204. Alternatively, in some implementations, the resistive heater path 402 follows a pattern that is distributed unevenly across the heating element 204, and has a density profile consistent with a temperature profile of the battery 102. For example, a region 404 of the heating element 204 will be disposed in contact with a portion of the battery 102 that is close to the device housing 110 of the electronic device 100 and has a greater chance of being exposed to low temperatures. A density of the resistive heater path 402 is increased locally at the region 404 of the heating element 204.

In some implementations, when the one or more rechargeable battery cells 202 are assembled in the battery 102, the one or more rechargeable battery cells 202 collectively form a substantially flat three-dimensional (3D) shape having a thickness (t) that is substantially smaller than a length (l) or a width (w) of the 3D shape. The 3D shape of the one or more rechargeable battery cells 202 has two opposing surfaces defined by the length (l) and the width (w) of the 3D shape. Referring to FIG. 4A, the heating element 204A has an area 408 that matches one of the two opposing surfaces. The heating element 204A can be attached to the one of the two opposing surfaces or disposed between two adjacent battery cells 202. Referring to FIGS. 4B and 4C, the heating element 204B or 204C includes two areas 406 and 408 that match the two opposing surfaces and are configured to provide heat to the battery 102 via the two opposing sides of the one or more rechargeable battery cell 202 when the heating element 204B or 204C is integrated in the battery 102. Each of the two areas 406 and 408 has a respective size that is optionally smaller than or equal to a size of each of the opposing surfaces of the one or more rechargeable battery cells 202.

The resistive heater path 402 has a first path end 322 and a second path end 324. Each of the first and second path ends 322 and 324 is supported by a respective portion of a substrate of the heating element 204 that extends from a first side 412A of the area 408 of the heating element 204 to reach an internal connection board 302. The two areas 406 and 408 of the heating element 204B or 204C are connected via a bridging area 410. The heating element 204B or 204C is folded at the bridging area 410 such that the areas 406 or 408 can be wrapped onto the opposing sides of one or more rechargeable battery cells 202. Referring to FIG. 4B, the bridging area 410) optionally extends from a second side 412B of the area 408 that is opposite to the first side 412A of the area 408, and has a width ($w^B$) that is less than or equal to a width w' of the area 406 or 408. Referring to FIG. 4C, the bridging area 410 optionally extends from a third side 412C of the area 408 that is connected to the first side 412A of the area 408, and has a width ($w_B$) that is less than or equal to a length l' of the area 406 or 408. The bridging area 410 has a length ($l_B$) that matches a thickness (t) of the one or more battery cells 202 to be wrapped by the heating element 204B or 204C. Additionally, the resistive heater path 402 follows a respective pattern (e.g., has a serpentine shape) on each of the areas 406 or 408. Optionally, the respective patterns are not used on the bridging area 410. The resistive heater path 402 of the areas 406 or 408 extends over the bridging area 410 and is not electrically decoupled on the bridging area 410. Optionally, the resistive heater path 402 follows the same pattern on the bridging area 410 and the areas 406 and 408. Each of the areas 408 and 410 is optionally stiff or flexible, and the bridging area 410 is flexible.

Figure 5:
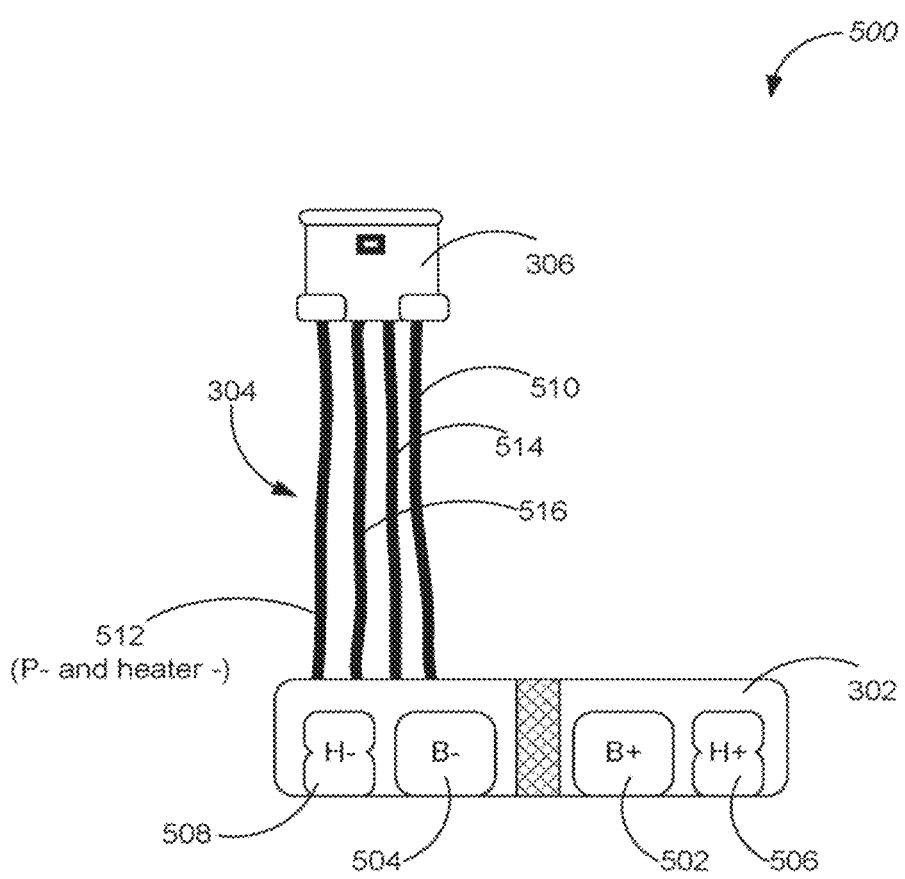
FIG. 5 illustrates a connection assembly of a battery for electrically coupling one or more battery cells to a logic board (e.g., a main board) external to the battery, in accordance with some implementations.

FIG. 5 illustrates a connection assembly 500 of a battery 102 for electrically coupling one or more battery cells 202 to a logic board (e.g., a main board 128) external to the battery 102, in accordance with some implementations. The connection assembly 500 includes an internal connection board 302, a battery interconnect link 304, and a connector 306. The internal connection board 302 is electrically coupled to the one or more battery cells 202 having a high supply node (i.e., a cathode 308) and a low supply node (i.e., an anode 310) of the battery 102. The battery interconnect link 304 includes a plurality of interconnects for coupling the supply nodes of the battery 102 further to the connector 306. A length of the battery interconnect link 304 is greater than a distance of the supply nodes of the battery 102 and a receiving connector of the logic board configured to receive the connector 306. Terminals of the connector 306 match terminals of the receiving connector assembled on the logic board. When the connector 306 is mechanically and electrically coupled to the receiving connector of the logic board, the connector 306 provides power of the battery 102 to electronic components of the logic board or charges the battery 102 with an external power source 228 via the logic board.

In some implementations, the internal connection board 302 includes a first battery pad 502, a second battery pad 504, a first heater pad 506, and a second heater pad 508. The first and second battery pads 502 and 504 are electrically coupled to the cathode and anode 308 and 310 of the battery 102, respectively. The first and second heater pads 506 and 508 are electrically coupled to the first and second path ends 322 and 324 of the resistive heater path 402 of the heating element 204, respectively. The first and second battery pads 502 and 504 and the first heater pad 506 are further coupled to corresponding terminals of the connector 306 via a first battery interconnect 510, a second battery interconnect 512, and a heater interconnect 514 of the battery interconnect link 304, respectively. Further, in some implementations, the second heater pad 508 is coupled or shorted to the second battery pad 504 on the internal connection board 302, and therefore, electrically coupled to the second battery interconnect 512 of the battery interconnect link 304 as well. In some implementations not shown in FIG. 5, the second heater pad 508 is coupled or shorted to the first battery pad 502 on the internal connection board 302, and therefore, electrically coupled to the first battery interconnect 510 of the battery interconnect link 304.

In some implementations, the battery interconnect link 304 further includes an NTC interconnect 516, and the connector 306 further includes an NTC terminal 218 coupled to the NTC interconnect 516. Referring to FIG. 2, the battery 102 includes an NTC thermistor 216 that is optionally disposed on the internal connection board 302 or in proximity to one of the one or more battery cells 202 of the battery 102. The NTC thermistor 216 is electrically coupled to the NTC terminal 218 of the connector 306. The NTC thermistor 216 has a first resistance configured to vary with an operating temperature of the battery 102, and an output of the NTC terminal indicates the operating temperature of the battery 102. In an example, the NTC thermistor 216 is electrically coupled between the first terminal 210) and the NTC terminal 218 of the connector, and a voltage bias across the NTC thermistor 216 is monitored at the first and NTC terminals 210 and 218 to determine the operating temperature of the battery 102. Further, in some implementations, a heater voltage is applied to the heater terminal 214 in accordance with a determination that the output of the NTC terminal 218 satisfies a predefined heating condition (e.g., the operating temperature of the battery 102 is lower than a threshold temperature). The heater voltage is dynamically adjusted according to the output of the NTC terminal 218, thereby maintaining the operating temperature of the battery 102 above the threshold temperature.

Figure 6A:
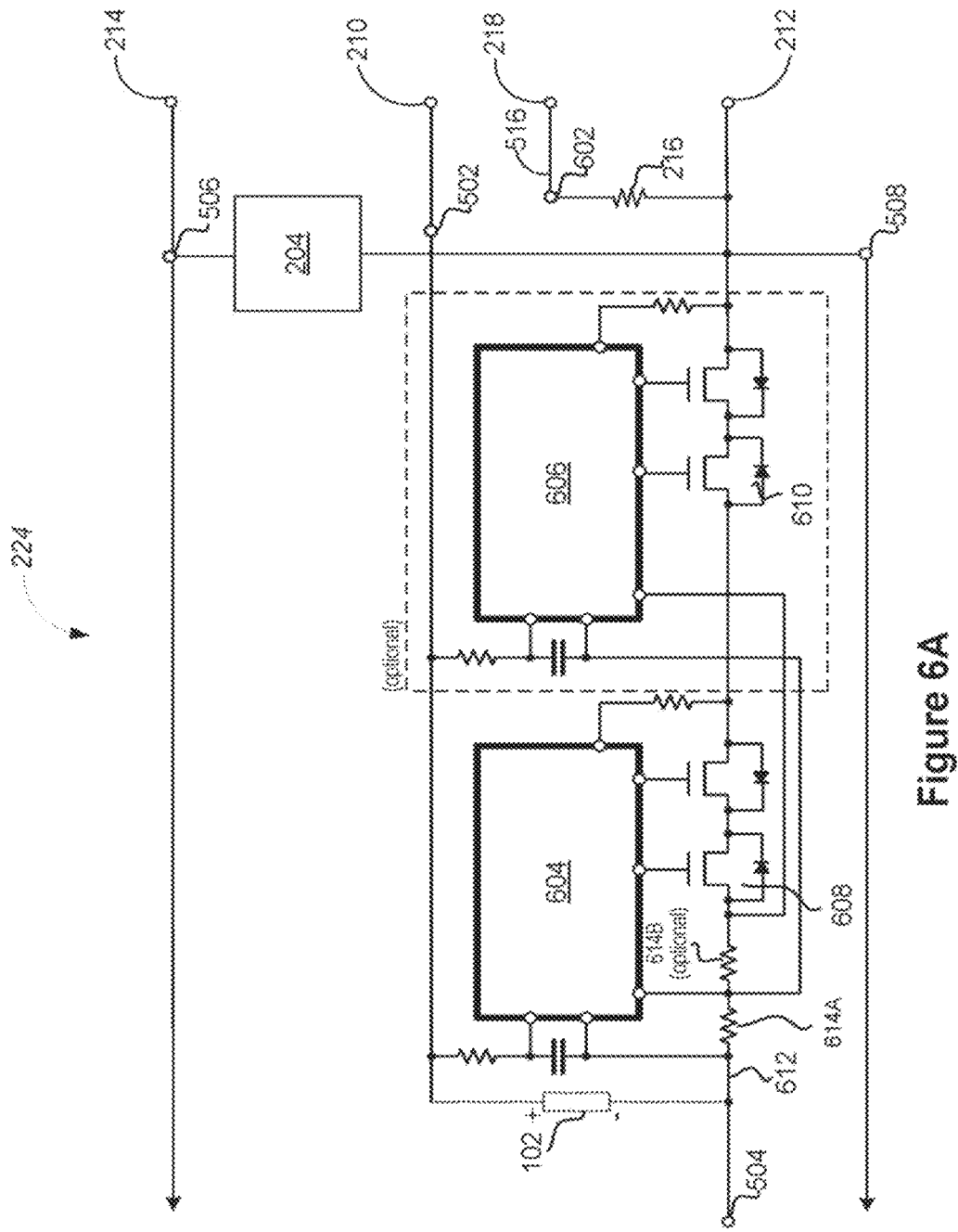
FIGS. 6A and 6B are circuit diagrams of two example battery protection systems, in accordance with some implementations.
Figure 6B:
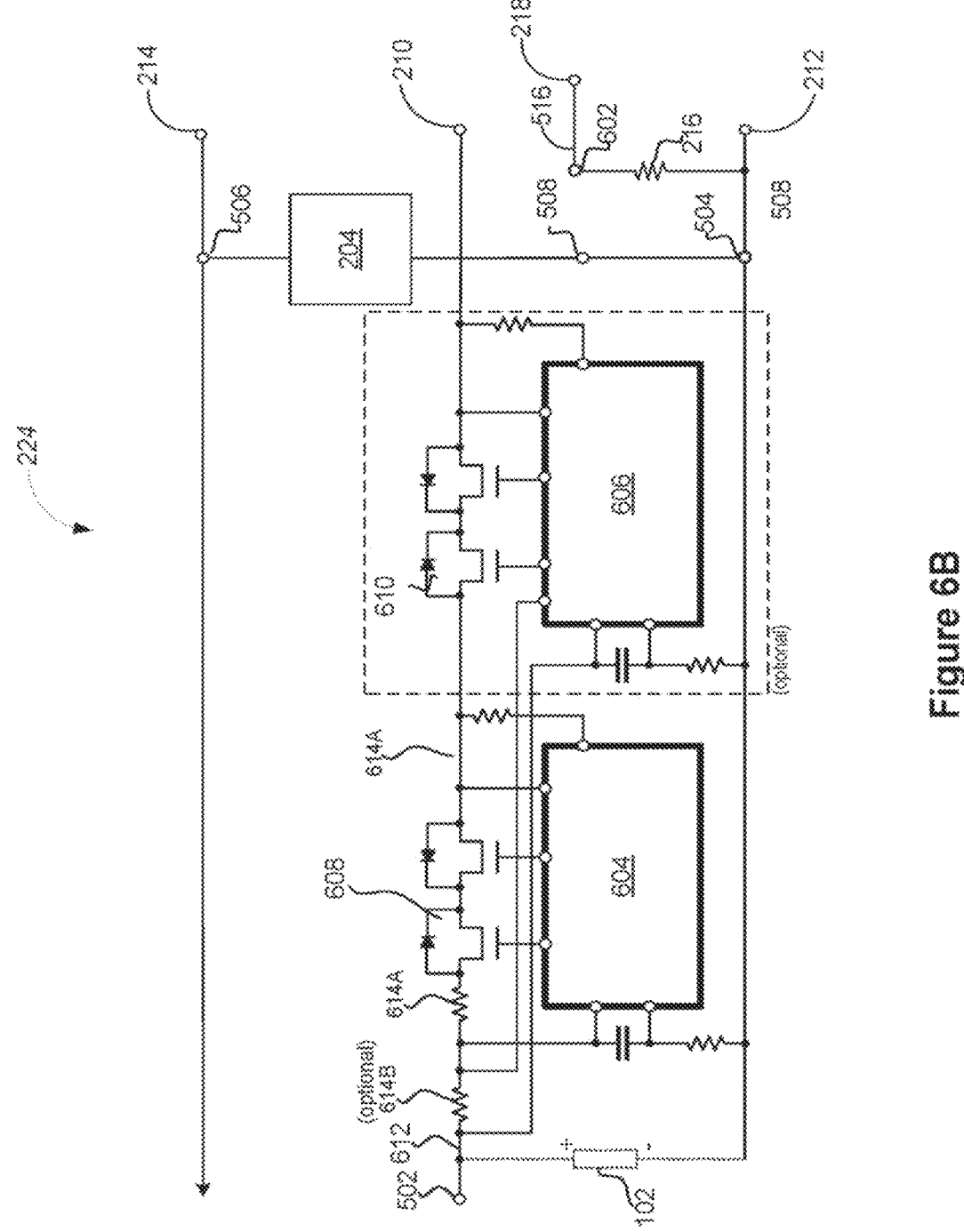

FIGS. 6A and 6B are circuit diagrams of two battery protection systems 224, in accordance with some implementations. Each battery protection system 224 is configured to determine whether the battery 102 is functioning abnormally (e.g., overcharged, undercharged, or shorted) and disconnect the battery 102 upon detection of an abnormal condition (e.g., overcharge, undercharge or short condition) of the battery 102. The battery protection system 224 is disposed on the internal connection board 302, and electrically coupled to the first battery pad 502, the second battery pad 504, and the second heater pad 508. The battery protection system 224 operates independently of the first heater pad 506, while being coupled to the first heater pad 506 via a heating element 204. Conversely, in some implementations (not shown), the battery protection system 224 is disposed on a logic board external to the battery 102 and electrically coupled to the battery 102 via the connector 306. In some implementations, the battery protection system 224 includes an NTC thermistor 216 coupled between the second battery pad 504 and an NTC node 602, and the NTC node 602 is electrically coupled to an NTC interconnect 516 of the battery interconnect link 304 and an NTC terminal 218 of the connector 306.

The battery protection system 224 includes a first protection integrated circuit (PIC) 604 and a first switch component 608. The first PIC 604 is a power controller coupled to the first switch component 608, and configured to control charging and discharging of the battery 102 via the first switch component 608. In some implementations, the battery protection system 224 further includes a second PIC 606 and a second switch component 610. The second PIC 606 is another distinct power controller coupled to the second switch component 610 and configured to control charging and discharging of the battery 102 via the second switch component 610. The first and second switch components 608 and 610 are coupled in series with each other and with the battery 102 along a charging and discharging path 612. Each of the switch components 608 and 610 can be controlled by a corresponding PIC 604 or 606 to manage charging and discharging of the battery 102. Further, in some implementations, each of the first and second switch components 608 and 610 includes a charging switch and a discharging switch that is arranged on the charging and discharging path 612 for controlling charging and discharging of the battery 102 separately.

In some implementations, two monitor resistors 614A and 614B are coupled in series with each other and with the battery 102 and the switch components 608 and 610 along the charging and discharging path 612. The monitor resistors 614 are also coupled in series with the one or more battery cells 102 on the direct current (DC) charging and discharging path 612. Each of the first and second PICs 604 and 606 is coupled to the monitor resistor 614A or 614B, and configured to monitor a voltage drop on the monitor resistor 614A or 614B and determine whether the battery 102 is functioning abnormally based on the voltage drop on the monitor resistor 614A or 614B, respectively.

The internal connection board 302 includes the first battery pad 502, second battery pad 504, first heater pad 506, and second heater pad 508. Referring to FIG. 6A, the second heater pad 508 is coupled to the second battery pad 504 via part of the battery protection system 224, e.g., one of more of the monitor resistors 614 and the switch components 608 and 610. In some situations, when an operating temperature of the battery 102 drops below a threshold temperature, the battery protection system 224 detects an abnormal condition of the battery and disables charging or discharging of the battery 102. The heating element 204 can still be heated to warm up the battery 102 by the external power source 228, when a heater voltage and a low supply voltage are applied via the first and second heater pads 506 and 508 without being impacted by the battery protection system 224. Alternatively, in some implementations not shown in FIG. 6A, the second heater pad 508 is shorted to the first battery pad 502 directly. When the battery protection system 224 detects an abnormal condition of the battery, it disables both charging/discharging of the battery 102. The heating element 204 can also be heated to warm up the battery 102 by the external power source 228, when a high supply voltage and a heater voltage are applied via the first and second heater pads 506 and 508 without being impacted by the battery protection system 224.

Referring to FIG. 6B, in some implementations with high side battery protection, the second heater pad 508 is electrically shorted to the second battery pad 504 directly. Optionally, a single pad can be used in place of the pads 504 and 508, thereby reducing a footprint size of the internal connection board 302. When the battery protection system 224 detects an abnormal condition of the battery, it disables both charging/discharging of the battery 102. The heating element 204 can be heated to warm up the battery 102 by the external power source 228, when a high supply voltage and a heater voltage are applied via the first and second heater pads 506 and 508 without being impacted by the battery protection system 224.

Figures 7A, 7B, 7C:
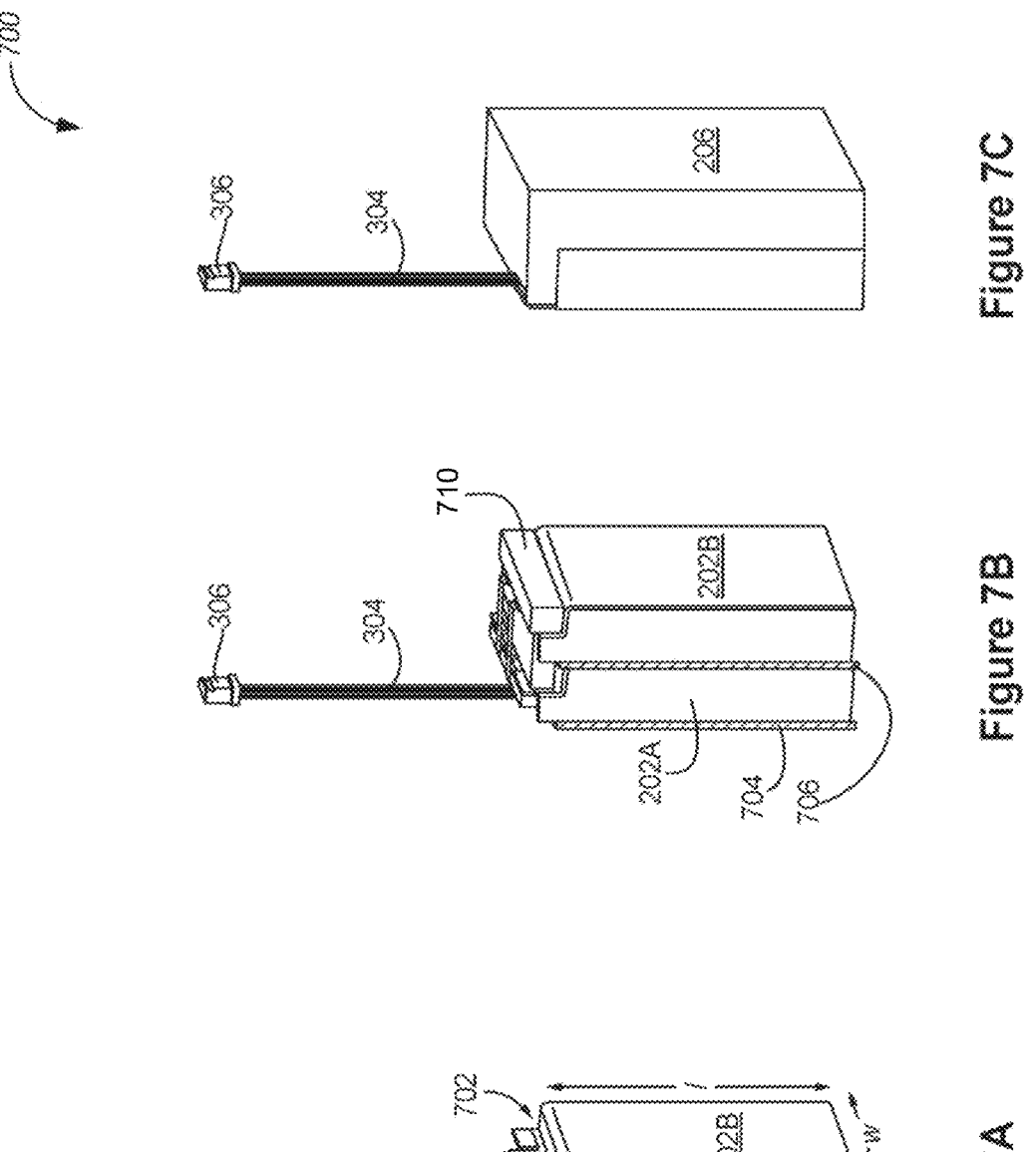
FIGS. 7A-7C illustrate a process of assembling a battery having more than one battery cell, in accordance with some implementations. Particularly.
Figure 7D:
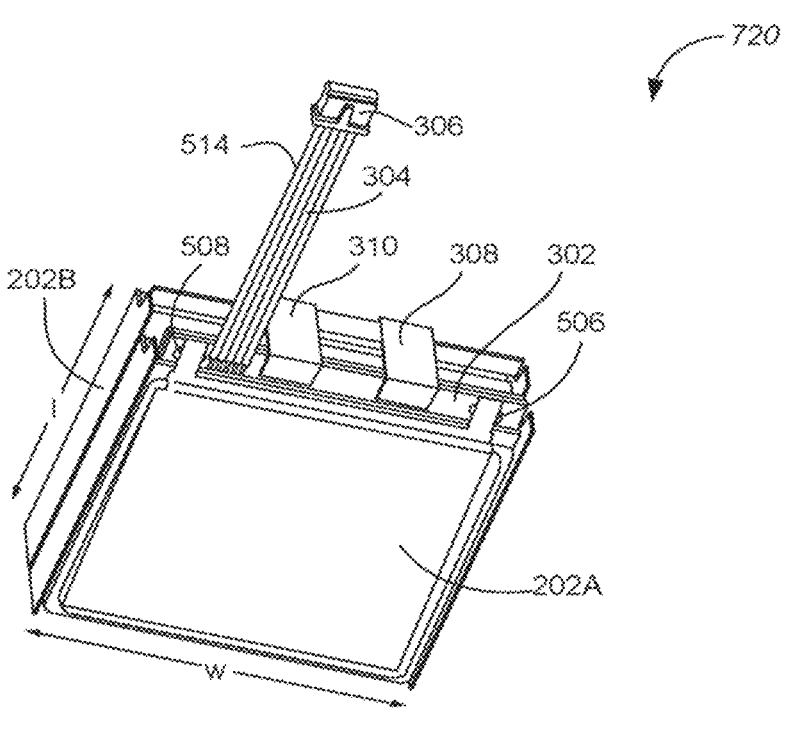
FIGS. 7D and 7E are a perspective view and a front view of the battery without the waterproof material, in accordance with some implementations, respectively.
Figure 7E:
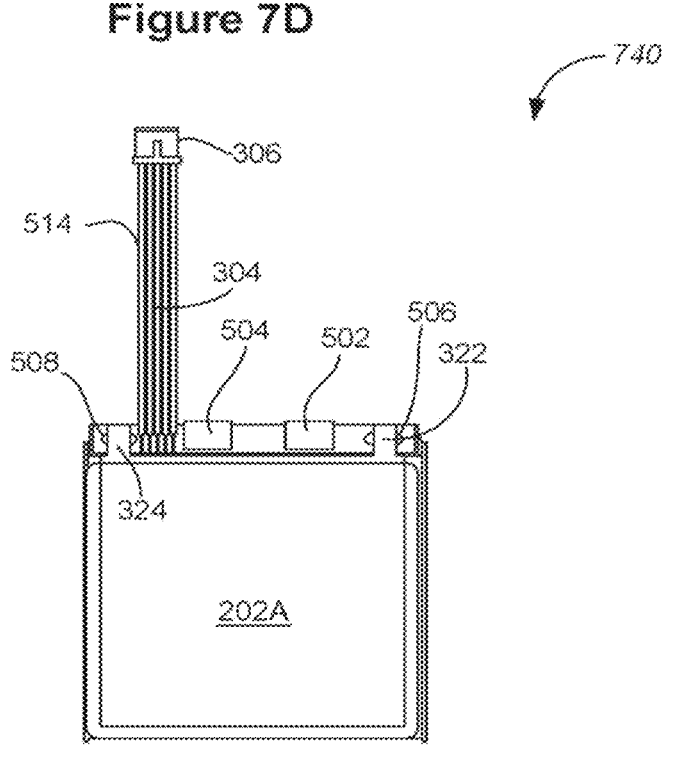
Figures 7F, 7G:
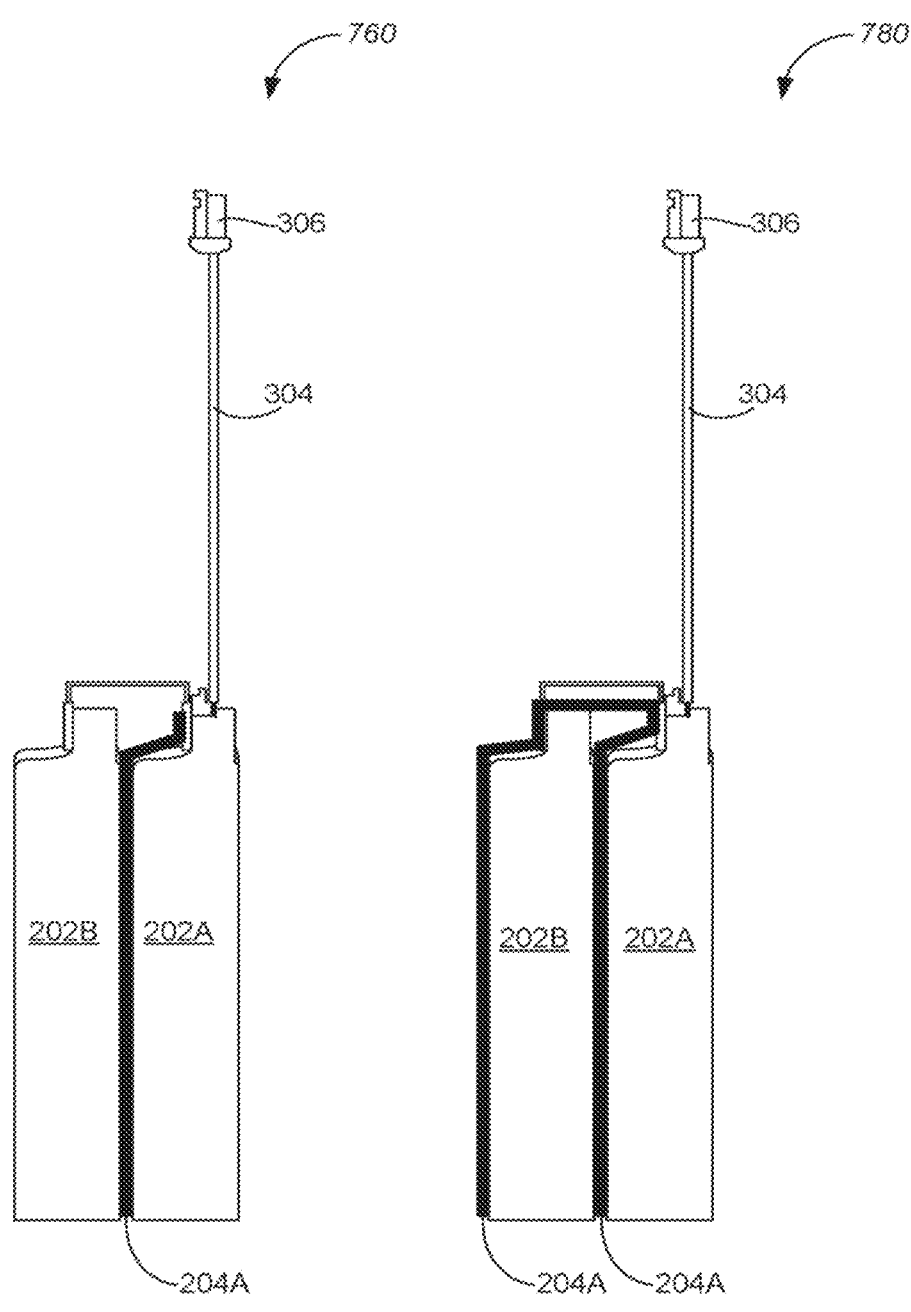
FIGS. 7F and 7G are two side views of the battery without the waterproof material, in accordance with some implementations.

FIGS. 7A-7C illustrate a process 700 of assembling a battery 102 having more than one battery cell 202, in accordance with some implementations. Particularly, FIGS. 7A and 7B illustrate a battery 102 that has not been wrapped with a waterproof material 206, and FIG. 7C illustrates a battery 102 that is wrapped with the waterproof material 206. FIGS. 7D and 7E are a perspective view 720 and a front view 740 of the battery 102 without the waterproof material 206, in accordance with some implementations, respectively. FIGS. 7F and 7G are two side views 760 and 780 of the battery 102 without the waterproof material 206, in accordance with some implementations.

The battery 102 has two battery cells 202 that are arranged in a 1S2P parallel battery configuration. The waterproof material 206 is wrapped around an exterior of a heating element 204 and the two battery cells 202. An internal connection board 302 and a battery end of a battery interconnect link 304 coupled to the internal connection board 302 are also enclosed in the waterproof material 206. The remainder of the battery interconnect link 304 extends out from an opening of the battery interconnect link 304, and is terminated at a connector 306. The connector 306 is configured to match a receiving connector of a logic board. In some implementations, the logic board includes a temperature control circuit 230) configured to apply a heater voltage to a heater terminal 214 when an operating temperature of the battery 102 is lower than a threshold temperature and adjust the heater voltage dynamically according to the operating temperature of the battery 102. Alternatively, in some implementations, the temperature control circuit 230 is at least partially disposed on the internal connection board 302 that is enclosed in the waterproof material 206.

Referring to FIG. 7A, when the waterproof material 206 is removed from and not wrapped onto the battery 102, the two battery cells 202A and 202B are exposed. The two battery cells 202A and 202B each have surfaces with a length (l) or a width (w), and are stacked to collectively form a substantially flat three-dimensional (3D) shape having a thickness (1) that is substantially smaller than the length (l) and width (w) of the 3D shape. Two opposite electrodes (i.e., a cathode 308 and an anode 310) of the battery 102 are formed and electrically coupled to the battery cells 202A and 202B on a first end 702 of the battery 102. The heater element 204 has a resistive heater path 402 including a first path end 322 and a second path end 324. The first and second path ends 324 are also extended to the first end 702 of the battery 102. The internal connection board 302 is disposed near the first end 702 of the battery, and configured to receive the first and second path end 322 and 324 and the two opposite electrodes of the battery 102.

In some implementations, each of the battery cells 202A and 202B is partially recessed at the first end 702. The internal connection board 302 is positioned near the first end 702, and the two opposite electrodes 308 and 310 of the battery cells 202 and the first and second path ends 322 and 324 of the heating element 204 are electrically coupled to the pads 502-508 of the internal connection board 302 at the first end 702. In some situations, a protective material 710 is applied at a recess 702 of each of the battery cells 202 to provide electrical insulation and mechanical protection to the electrodes 308 and 310 of the battery cells 202 and the first and second path ends 322 and 324 of the heating element 204. Optionally, the protective material 710 is made of a piece of insulating foam. The waterproof material 206 is wrapped around an exterior of the heating element 204 and the battery cells 202, thereby preventing ambient water from contacting the heating element 204 and battery cells 202.

In some implementations, the heating element 204 is wrapped around an exterior of the two battery cells 202A and 202B that are attached to each other. Alternatively, in some implementations, the heating element 204 is wrapped around an exterior of only one of the two battery cells 202A and 202B. The path ends 322 and 324 of the corresponding resistive heater path 402 are extended to the first end 702 of the battery 102, and received by the first and second heater pads 506 and 508 of the internal connection board 302. Alternatively, in some implementations, the heating element 204 includes a first heating element (e.g., 204B in FIG. 4B or 204C in FIG. 4C) and a second heating element (e.g., 204B in FIG. 4B or 204C in FIG. 4C). The first heating element and the second heating element are wrapped around an exterior of the two battery cells 202A and 202B, respectively. Optionally, resistive heater paths of the first and second heating elements are electrically coupled in series to terminate at their respective path ends 322 and 324. Optionally, the resistive heater paths of the first and second heating elements are electrically coupled in parallel at their respective path ends 322 and 324, which are received by the first and second heater pads 506 and 508 of the internal connection board 302.

Referring to FIGS. 7F, in some implementations, the heating element 204 is not wrapped around any battery cell or cells. Rather, the heating element 204 (e.g., 204A in FIG. 4A) has an area that is equal to or smaller than that of the surfaces of the battery 102 having the length (l) and width (w). The heating element 204 is disposed between the waterproof material 206 and the battery cell 202A, between the two battery cells 202A and 202B, or between the waterproof material 206 and the battery cell 202B. Referring to FIG. 7G, the heating element 204 includes a plurality of heating element sheets (e.g., 204A in FIG. 4A) each of which has a respective area equal to or smaller than that of the surfaces of the battery 102 having the length (l) and width (w). Each heating element sheet has a resistive heater path having path ends 322 and 324 that are electrically coupled to the first and second heater pads 506 and 508 of the internal connection board 302.

Referring to FIG. 7B, in some implementations, a first thermal spreader sheet 704 is disposed between the battery cell 202A and heating element 204 that is immediately adjacent to the battery cell 202A, and/or between the battery cell 202B and heating element 204 that is immediately adjacent to the battery cell 202B. The first thermal spreader sheet 704 is configured to distribute heat generated by the heating element 204 and the battery cells 202A and/or 202B evenly. Additionally or alternatively, in some implementations, a second thermal spreader sheet 706 is disposed between the battery cells 202A and 202B, which are otherwise immediately adjacent to each other, and configured to distribute heat evenly between the battery cells 202A and 202B.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A battery, comprising:
a connector including a first terminal, a second terminal, and a heater terminal;
one or more rechargeable battery cells electrically coupled to the first and second terminals of the connector;
a heating element that is in contact with at least a subset of the one or more rechargeable battery cells, the heating element including a resistive heater path electrically coupled to the heater terminal and one of the first and second terminals of the connector, wherein the resistive heater path of the heating element generates heat to warm the battery when a heater voltage is applied to the heater terminal; and
a water resistant material that is wrapped around an exterior of the heating element and the one or more rechargeable battery cells, wherein the water resistant material prevents ambient water from contacting the heating element and battery cells and includes an opening to allow at least the first and second terminals of the connector to be electrically coupled to a logic board.

2. The battery of claim 1, wherein the heater terminal is electrically coupled to an output of a temperature control circuit that provides the heater voltage to the heater terminal when an operating temperature of the battery is lower than a threshold temperature, and that dynamically adjusts the heater voltage according to the operating temperature of the battery.

3. The battery of claim 2, wherein the battery includes a temperature sensor that is disposed between the heating element and the one or more rechargeable battery cells and that determines the operating temperature of the battery.

4. The battery of claim 1, further comprising:
a negative temperature coefficient (NTC) thermistor having a first resistance configured to vary with an operating temperature of the battery,
wherein the connector further includes an NTC terminal coupled to the NTC thermistor.

5. The battery of claim 4, wherein an output of the NTC terminal indicates the operating temperature of the battery, and the heater voltage is applied to the heater terminal in accordance with a determination that the output of the NTC terminal satisfies a predefined heating condition, and wherein the heater voltage is dynamically adjusted according to the output of the NTC terminal.

6. The battery of claim 4, further comprising:
a resistor having a second resistance configured to remain substantially constant with the operating temperature of the battery, wherein the resistor and the NTC thermistor are coupled in series and biased between the first and second terminals, and an output of the NTC terminal is applied to determine whether the operating temperature of the battery is lower than a threshold temperature.

7. The battery of claim 1, wherein the first and second terminals are coupled to a high supply node and a low supply node of the battery, respectively, and the resistive heater path is electrically coupled to the heater terminal and the second terminal of the connector, and wherein when an operating temperature of the battery is lower than a threshold temperature, the heater voltage is higher than the low supply node and inversely related to the operating temperature of the battery.

8. The battery of claim 1, wherein the first and second terminals are coupled to a high supply node and a low supply node of the battery, respectively, and the resistive heater path is electrically coupled to the first terminal and the heater terminal of the connector, and wherein when an operating temperature of the battery is lower than a threshold temperature, the heater voltage is lower than the high supply node and positively related to the operating temperature of the battery.

9. The battery of claim 1, wherein the connector further comprises:
an internal connection board disposed in proximity to the one or more rechargeable battery cells and having a first battery pad, a second battery pad, a first heater pad, and a second heater pad;
a first battery interconnect coupling the first battery pad to the first terminal;
a second battery interconnect coupling the second battery pad and the second heater pad to the second terminal; and
a heater interconnect coupling the first heater pad to the heater terminal.

10. The battery of claim 1, wherein the heating element includes a polymeric substrate that supports and electrically insulates portions of the resistive heater path.

11. The battery of claim 1, further comprising a first thermal spreader sheet disposed between the one or more rechargeable battery cells and the heating element, the first thermal spreader sheet being configured to distribute heat generated by the heating element and the battery cells.

12. The battery of claim 1, further comprising a second thermal spreader sheet, wherein the second thermal spreader sheet is disposed between two immediately adjacent battery cells and configured to distribute heat between the two immediately adjacent battery cells.

13. The battery of claim 1, wherein the connector is mechanically and electrically coupled to a receiving connector assembled on the logic board, and wherein a battery protection circuit is disposed in the battery and electrically coupled to the first and second terminals of the connector.

14. The battery of claim 1, wherein the battery is integrated in a doorbell camera, and configured to drive a camera system of the doorbell camera at least during a duration of time when a doorbell button is pressed.

15. The battery of claim 1, wherein the one or more rechargeable battery cells include a first subset of battery cells and a second subset of battery cell that is arranged in series with the first subset of battery cells, and each of the first and second subsets of the battery cells includes a respective set of battery cells that are arranged in parallel within the respective subset.

16. The battery of claim 1, wherein a first region of the heating element comprises a first portion of the resistive heater path, the first portion of the resistive heater path comprising a greater density of the resistive heater path than a second region of the heating element.

17. The battery of claim 16, wherein the first region of the heating element is configured to come in contact with a portion of the at least the subset of the one or more rechargeable battery cells, and wherein the portion is exposed to lower temperatures than other portions of the battery.

18. The battery of claim 1, wherein the heating element comprises two areas configured to provide heat to the one or more rechargeable battery cells via two opposing sides of one or more rechargeable battery cells.

19. The battery of claim 18, wherein the two areas of the heating element are connected via a bridging area, and wherein the heating element is folded at the bridging area such that the two areas are wrapped onto the two opposing sides of one or more rechargeable battery cells.

20. The battery of claim 19, wherein the heating element is folded at the bridging area in a top-to-bottom fashion or a side-to-side fashion, and wherein the bridging area comprises a length that is substantially equal to a thickness of the one or more rechargeable battery cells.

\* \* \* \* \*